Oct. 26, 1926.

A. W. CAPS

1,604,765

PHOTOGRAPHIC APPARATUS

Filed Jan. 28, 1924    7 Sheets-Sheet 1

Inventor,
Arthur W. Caps
By James L. Norris
Attorney

Patented Oct. 26, 1926.

1,604,765

UNITED STATES PATENT OFFICE.

ARTHUR W. CAPS, OF KANSAS CITY, MISSOURI, ASSIGNOR, BY MESNE ASSIGNMENTS, TO PHOTOSTAT CORPORATION, OF PROVIDENCE, RHODE ISLAND, A CORPORATION OF RHODE ISLAND.

PHOTOGRAPHIC APPARATUS.

Application filed January 28, 1924. Serial No. 689,085.

The present invention relates to improvements in photographic apparatus, and more especially to apparatus of the kind adapted for the photographic reproduction of books, records, documents of various kinds, and the like, upon photographically sensitized paper or other material contained within the apparatus, the exposed photographic paper, in the preferred embodiment of the invention, being received by developing and fixing means contained within the apparatus, whereby all of the operations necessary for the production of the finished photographic prints or reproductions may be performed quickly and with facility. An example of photographic apparatus of this general class is disclosed in U. S. Letters Patent No. 929,757, granted August 3, 1909.

In the development of photographic apparatus of this general class, use has been made of means whereby photographic exposures are made on oppositely positioned photographically sensitized surfaces, such as on the opposite sides of a sheet of paper which is photographically sensitized on both of its sides, such an apparatus being disclosed in U. S. Letters Patent No. 1,003,300, granted September 12, 1911, such apparatus possessing certain advantages and effecting economies, as well known to those skilled in the art.

A primary object of the present invention is to provide a novel and improved photographic apparatus of the kind embodying means for exposing sensitized surfaces while positioned oppositely or back-to-back, whereby the lens images of the objects to be reproduced are rendered visible to the operator during focussing of the apparatus, thereby enabling the apparatus to be focussed accurately so that clear and sharply defined reproductions may be obtained.

Another object of the invention is to provide an apparatus of this kind whereby the photographic reproductions may be made either upon a sheet of, for example, paper or they made be made upon photographically sensitized plates, such as those which use a glass base for the sensitized surface.

Further objects of the invention are to provide a novel and improved casing for the developing and fixing tanks, whereby draining of any chemicals which may be spilt from such tanks, the collection of such drainings, and ventilation of the interior compartment containing such tanks, are provided for, thus avoiding deterioration of the apparatus due to moisture or the accumulation of the developing and fixing chemicals, and the camera compartment is protected from injurious influences of the chemicals in the developing and fixing tanks, to provide means for the inspection of the prints and for the removal of the developing and fixing tanks, when desired, and to provide other improvements which facilitate the operation and maintenance of the apparatus.

To these and other ends, the invention consists in certain improvements and combinations and arrangements of parts, all as will be hereinafter more fully described, the features of novelty being pointed out particularly in the claims at the end of the specification.

In the accompanying drawings:—

Similar parts are designated by the same reference characters in the several views.

The improvements provided by the present invention are applicable in part or in whole to photographic apparatus of various kinds, although in the present instance, the invention is shown applied to a photographic apparatus or photographic reproducing machine of the kind embodying a camera wherein photographic paper or other sensitized material is exposed to images of the objects being photographed or reproduced, and developing and fixing means which receive the exposed sections of the paper or material and complete the operations necessary for the production of finished prints. The construction shown in the accompanying drawings and hereinafter described in detail is the preferred one; but it is to be understood that equivalent constructions are contemplated and such will be included within the scope of the claims.

In the construction shown herein, the apparatus comprises a table 1 which may be of angle iron and sheet metal, 2 represents a copy-board or object holder which may be of any suitable construction. it being shown mounted on brackets 3 which are adapted to move longitudinally of the table 1, on tracks 4, a screw 5, operable by a crank of handle 6 serving to shift the copy-board in a direction longitudinally of the table 1 for the purpose of focussing the apparatus. The camera portion of the apparatus is shown mounted on the table 1 opposite to the copy-board 2, the intermediate portion of the table having a track 8 mounted thereon by means of the standards 9, the track 8 extending longitudinally of the table and supporting the lens holder 10 of the camera, so that the lens holder, together with the camera lens 11 carried thereby may be adjusted in a direction longitudinally of the table for focussing purposes. The lens holder 10 of the camera is connected by bellows 12 to the front of the head or casing 13 of the camera, so as to exclude all light from the interior of the camera head or casing, except that which enters through the lens 11.

Figure 1:
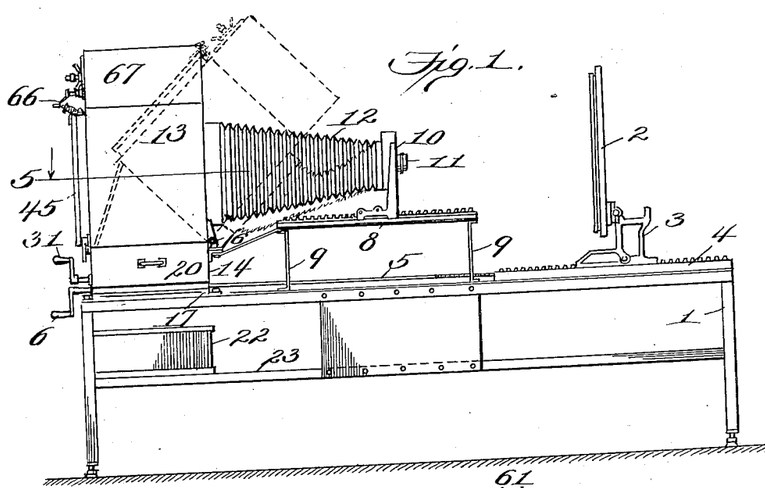
Figure 1 is a side elevation of photographic apparatus constructed in accordance with the present invention.
Figure 2:
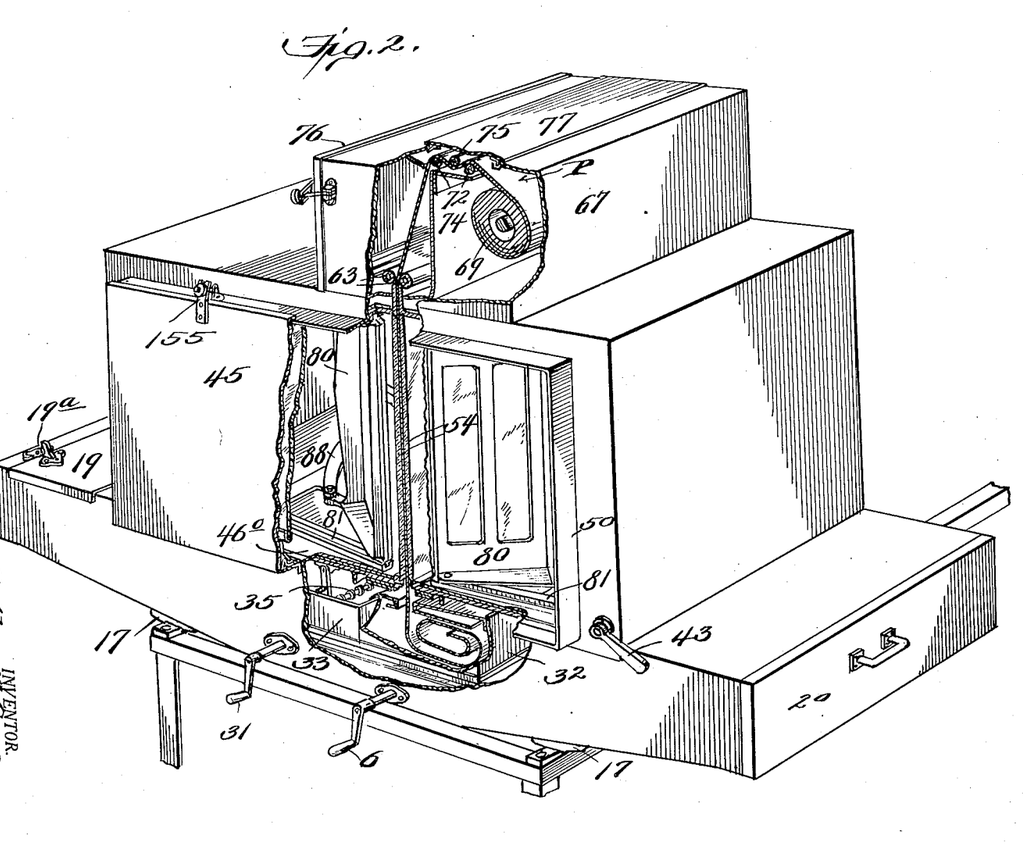
Figure 2 is a perspective view, on an enlarged scale, of the camera head and the chamber for the developing and fixing tanks, portions of the camera head and said chamber being broken away to show the interior mechanism.
Figure 3:
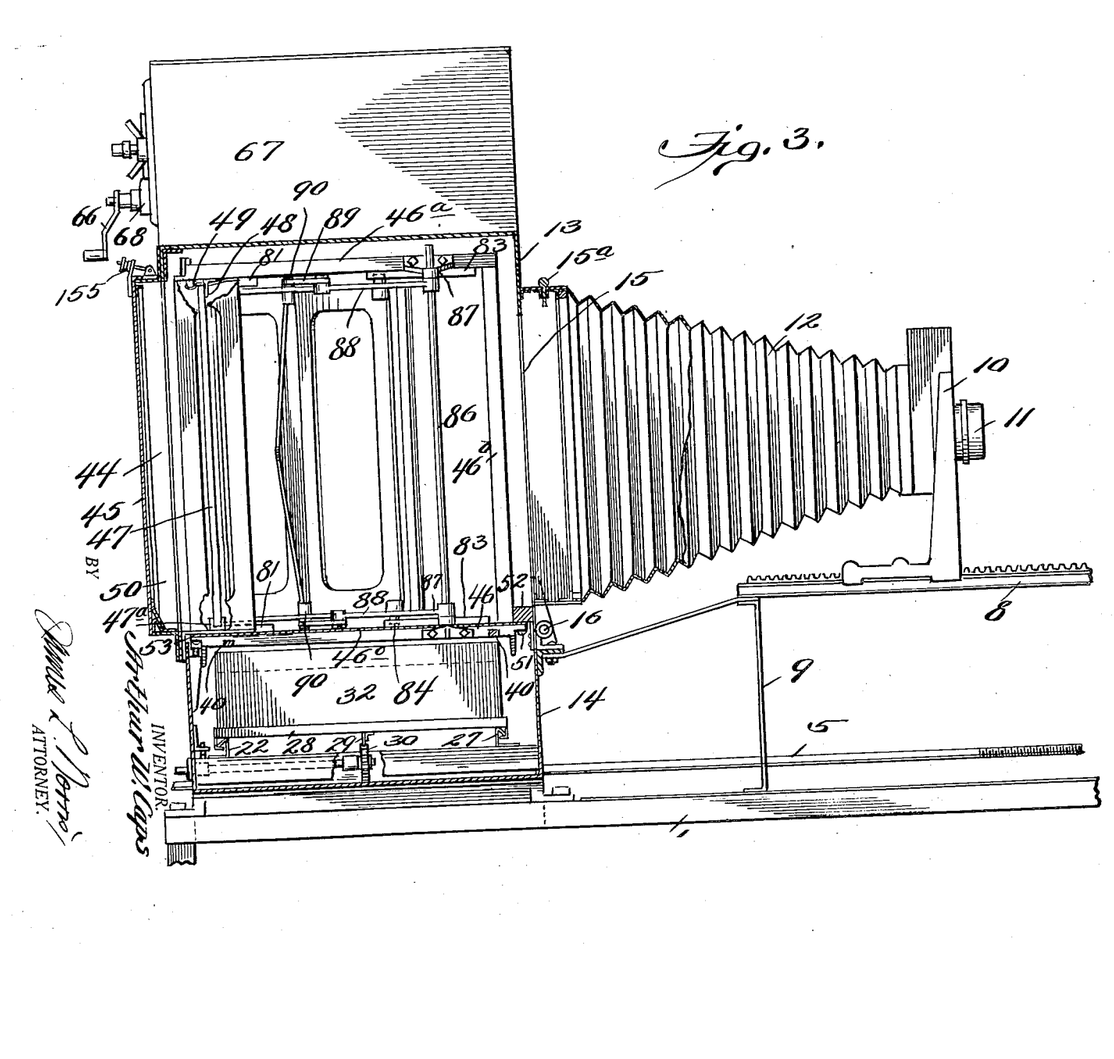
Figure 3 is a view partly in side elevation and partly in vertical section on the line 3—3 of Figure 5.

The camera head or casing 13, in the construction shown, is mounted upon a casing 14 which contains the developing and fixing means. it being preferable to pivotally attach the casing 13 at its forward edge to the forward edge of the casing 14, as by hinges 16, in order that the camera head or casing may be swung upwardly and forwardly, into substantially the dotted line position shown in Figure 1, thus rendering accessible the developing and fixing means contained in the lower casing 14.

The casing 14, which may be mounted on and secured to the table 1 by suitable brackets 17, is provided at its upper side and toward one end with a door 19 which is preferably hinged to the casing 14 along one edge, as by the hinges 19ª, this door, when opened, enabling the prints to be inspected immediately after they have dropped into the fixing bath, and the casing 14 is provided at its opposite end with a door 20 which may be hinged, slidable or otherwise movably mounted, this door normally closing the respective end of the casing 14, but enabling such end of the casing to be opened for the removal of the developing and fixing tanks and their carriage, as will hereinafter appear. Means is provided for draining any chemicals or other liquid that may spill within the chamber 14 and for collecting the chemicals or liquid so drained. As shown, the bottom of the casing 14 is sloped in a direction from its ends toward its center or intermediate portion, and the lowest portion of the bottom is provided with a transverse opening 21 through which any chemicals or liquid draining toward it along the sloping bottom of the casing will be discharged. A pan 22 may be mounted on a shelf 23 forming part of the table 1 in a position beneath the discharge opening 21, so that this pan will collect any drainings discharging from the opening 21.

Figure 4:
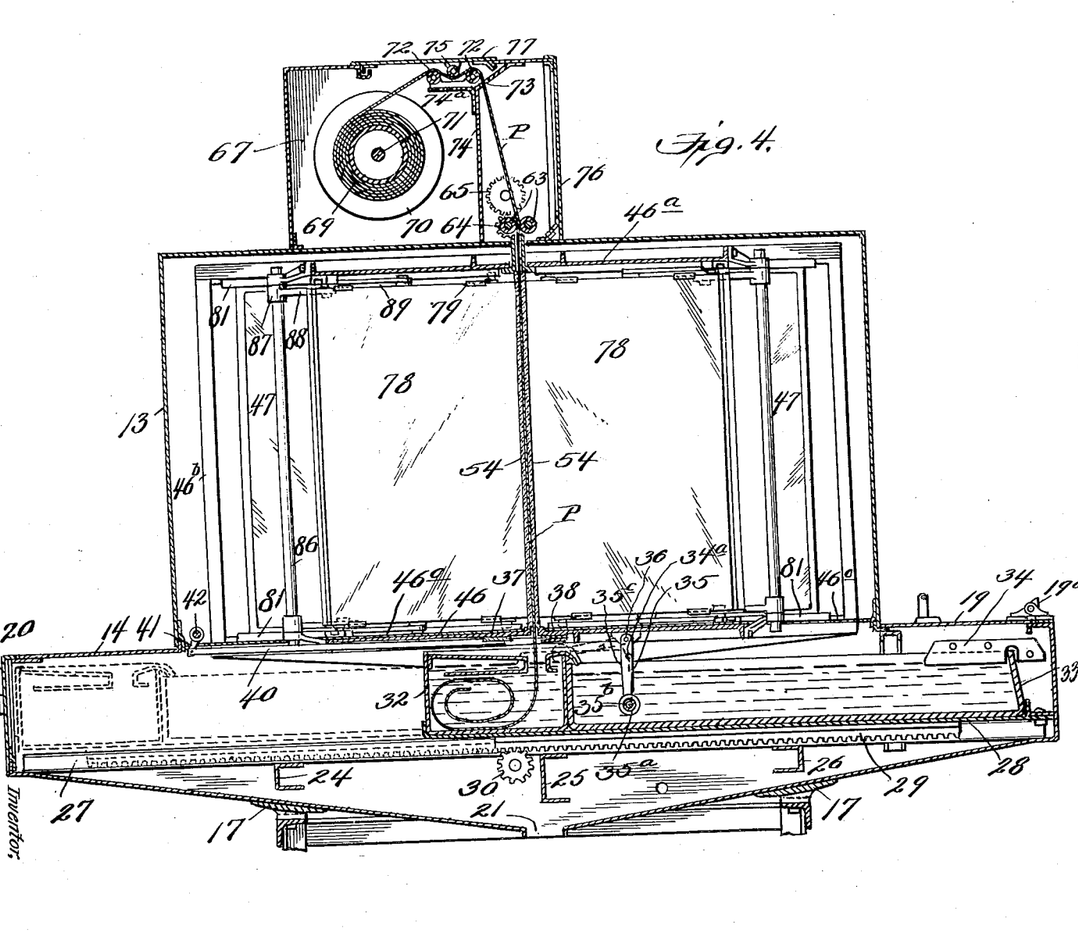
Figure 4 represents a vertical section through the camera head and the developing and fixing apparatus, on the line 4—4 of Figure 5.

Developing and fixing means of different kinds may be used, such means, as shown in the present instance, comprising developing and fixing tanks mounted on a carriage which is shiftable longitudinally within the casing 14, in consequence of which the developed portions of the sensitized material are first received in the developing tank and are then transferred to the fixing tank. As shown in the present instance, a suitable number of cross members 24, 25 and 26 are secured within the casing 14 and serve to support a pair of tracks 27 which are located in the lower portion of this casing. A carriage 28 is mounted to reciprocate longitudinally on the tracks and suitable means, such as a rack 29 secured to the underside of the carriage, a gear 30 meshing therewith, and a crank or handle 31 arranged on the outside of the casing, serves to reciprocate the carriage, together with the developing tank 32 and fixing tank 33 which are mounted thereon. In using developing and fixing tanks and a reciprocatory carriage, as just described, the carriage when shifted into the full line position shown in Figure 4, will position the developing tank 32 to receive an exposed section of the paper or sensitized medium, substantially as shown in Figure 4, and after this section of the paper has been permitted to remain in the developing tank for a sufficient period of time to effect development thereof, the carriage, together with the developing and fixing tanks thereon, are shifted into the dotted line position shown in Figure 4, and in consequence of this shifting movement of the carriage, the exposed and developed section of the paper in the developing tank is withdrawn therefrom and the fixing tank 33 is brought into a position to receive it. Finally a knife, to be hereinafter described, is operated to sever this portion of the paper from the remainder of the strip, whereupon the severed portion of the strip is free to settle into the hypo or fixing solution contained in the fixing tank 33. These operations are similar to those performed in operating the apparatus disclosed in Patent No. 929,757 referred to above.

An immerser 35 is preferably used to insure complete immersion of the print in the bath of fixing solution so as to insure thorough and uniform fixing of the print, the immerser comprising preferably a series of disks 35$^a$ which are mounted on a rod 35$^b$, the latter being carried by a pair of links 35$^c$ so that the immerser swings or is pendent from a pivot shaft 36 supported from the underside of the bottom wall 46 of the camera casing which normally overlies the casing 14, the immersing disks 35$^a$ being adapted to brush lightly over a print lying in the bath of fixing solution in the tank 33, as the carriage is reciprocated. However, at the moment when the print is severed from the remainder of the strip, at which time the developing and fixing tanks will occupy the dotted line position in Figure 4, the severed end of the print settles slowly into the fixing bath in the tank 33, and in order to avoid catching of the immerser upon the severed end of the print and consequent wrinkling of the print in consequence of premature reversal of the position of the carriage, means is provided for swinging the immerser into an elevated position and for holding it in such position until after the carriage has commenced its return motion toward the full line position shown in Figure 4. For accomplishing this purpose, cams 34 are mounted on the fixing tank 33 toward one end thereof, so that they will engage pins or projections 34$^a$ on the immerser, as the carriage assumes the dotted line position shown in Figure 4, in consequence of which the immerser will be swung into the dotted line position shown in Figure 4, and the immerser will remain in its upwardly swung position until after the carriage has commenced its return motion toward the full line position, whereupon the retracting cams 34 will permit the immerser to swing downwardly into the fixing tray and in so doing to bear upon the upper side of the severed end of the print, thus insuring complete immersion of the print and avoiding wrinkling or other injury thereto. The knife which serves to sever the exposed section of paper from the remainder of the strip comprises preferably a movable cutting blade 37 and a co-operative but relatively stationary plate 38, the latter being mounted on the underside of the wall 46, it being understood that the paper strip is fed downwardly between the blade 37 and the plate 38, these parts being normally separated. The blade 37 is preferably mounted to slide at its ends in grooves 39 formed in the underside of the wall 46, and the blade is provided with suitable means for reciprocating it, such means, as shown, comprising a pair of links 40 which are connected to the blade 37 at their inner ends and are operatively connected at their outer ends to cranks or levers 41 fixed to a shaft 42, the latter having one end projecting to the outside of the casing 14 and provided with an operating handle 43 by means of which the knife is actuated manually at the proper time. By mounting the knife and its operating connections on the underside of the bottom wall 46 of the camera casing 13, these parts are rendered accessible when the camera casing 13 is swung upwardly and forwardly into the dotted line position shown in Figure 1.

The front wall of the camera casing 13 is provided with an opening 15 for the entrance of light rays passing through the camera lens 11 and the bellows 12, and slides or stops 15ª may be provided for stopping off either a part or the whole of the opening 15. The opposite or rear wall of the camera casing 13 is provided with an opening 44 which is adapted to be covered and uncovered by a door 45, this door being normally in closed position and forming a light tight fit with the camera casing but being removable or capable of opening movement to uncover the opening 44 to expose and permit observation of images on a focussing screen or ground glasses 47 which are mounted by suitable means within the camera casing and in proper focussing relation with the camera lens 11. Preferably, these focussing or ground glasses are properly positioned at their lower ends in brackets 47ª and they are positioned at their upper edges by stops 48, spring clips 49 being preferably used which are adapted to engage the upper edges of the ground glasses and thus retain them removably in place. The camera casing 13 is preferably formed with a flange 50 which surrounds the opening 44 in rear of the ground glasses, the flange being adapted to receive, in place of the door 45, a plate-holder adapter 150 which has a flange 150ª to telescope over and form a light tight fit with the flange 50, the adapter embodying a chamber 151 to slidably receive an ordinary plate holder 152, and to hold a focussing screen or ground glass 153 which is yieldingly pressed forwardly or against the plate holder when the latter is in position within the adapter. In using the adapter, the camera is focussed by aid of the ground glass 153 while the plate holder is removed, and the exposure is made after the plate holder has been inserted into the adapter in front of the ground glass therein and the plate-holder slide has been withdrawn in the usual way, the ground glasses 47 having been previously removed. The adapter thus enables ordinary photographic plates, sheets of sensitized paper or similar photographic material to be positioned in the back of the camera casing in the focal plane of the lens, and exposed, if exposures on one side only of the photographic material should be desired. The adapter may be held removably in place at the top by clips 154 and clamps 155 which serve to hold the door 45 in place.

The supporting means 47ª, 48 and 49 for the focussing or ground glasses, together with other elements of the camera structure, are preferably mounted within the camera casing 13 by a suitable framework which, as shown in the present instance, comprises the lower plate 46, a similar upper plate 46ª and a suitable number of uprights 46ᵇ which rigidly connect the plates, the framework being attached to the casing 13 in any suitable manner as by screws 51 which secure one edge of the lower plate 46 to a ledge 52 fixed to the casing 13 and a plate 53 which is fixed to the opposite side of the casing 13 and has the adjacent end of the lower plate 46 suitably secured thereto. By this arrangement the elements of the camera including the focussing or ground glasses will be maintained in proper position within the camera casing 13, and the framework will swing upwardly and forwardly about the hinges 16 to uncover the developing and fixing means within the lower casing 14, when access to such parts is desired. Moreover, plates 46° are preferably applied to the lower wall 46 to completely close the bottom of the casing 13, whereby the camera elements contained therein will be protected from injurious influences of the chemicals in the lower casing 14.

The camera, as shown in the present instance, embodies means for exposing reversely positioned sensitized surfaces, as, for example, the sensitized surfaces on a strip of paper which is sensitized on both sides thereof from the camera lens 11, in accordance with the invention set forth in Patent No. 1,003,300, referred to above. To accomplish this result, a pair of transparent image glasses 54 are mounted in planes parallel to the optical axis of the camera lens 11, and, as shown, these image glasses are placed apart sufficiently to accommodate between them a strip of sensitized paper or other material, designated P, so that this strip of paper lies in a plane which is in alinement with the optical axis of the camera lens. Preferably, the paper P is photographically sensitized on both sides, its sensitized surfaces being adapted to be exposed through the respective transparent image glasses 54. The image glasses are preferably mounted between the lower and upper plates 46 and 46ª of the framework by bevelling the upper and lower edges of the image glasses and providing the lower plate 46 with corresponding shaped recesses 53 into which the lower bevelled edges of the image glasses 54 fit, these recesses being located at opposite sides of a slot 56 in the plate 46, through which the paper strip is adapted to pass; while the upper bevelled edges of the image glasses are adapted to fit in correspondingly shaped recesses 57 formed in plates 58, the latter being suitably secured to the upper plate 46ª. Preferably, the plates 58 are secured to the underside of the upper plate 46ª by screws 59 and supplemental screws 60 are threaded in the respective plates 58 and are adapted to bear against the underside of the plate 46ª at points between the screws 59 and the glass receiving recesses 57, so that tightening of the screws 60 will force the recessed portions of the plates 58 downwardly, thereby clamping the image glasses 54 between the plates 58 and the recessed portions of the lower plate 46. Guides 61 which form substantial continuations of the image glasses 54 are preferably provided above the glasses, these guides being spaced sufficiently apart to form a passageway 62 between them for the sensitized paper or strip P, the guides thus serving as means for introducing the end of the sensitized paper or strip into the space between the image glasses, when the strip is threaded into the camera, and for preventing buckling of the sensitized strip when the latter is fed downwardly by a pair of opposed feed rolls 63 which are located above the guides 61 and at the entrance to the paper passageway 62 between the guides. The guides 61 are preferably formed as upward continuations of the glass securing plates 58, as shown.

The feed rolls 63 bear against the opposite sides of the sensitized strip P, and one or both of these feed rolls may be driven whereby the feed rolls will revolve in opposite directions and thereby feed the sensitized strip downwardly between the image glasses 54. As shown, one of the feed rolls is provided with a gear 64 which meshes with a drive gear 65 and this driving gear may be revolved at the proper times by a crank 66 to which it is connected, this crank being located exteriorly of a casing 67 which contains a supply of sensitized paper or material. Preferably a measuring device 68 is associated with the paper feeding crank 66 whereby sections of paper or sensitized material of any desired predetermined length may be fed into position between the image glasses 54 preceding each exposing operation. For example, a measuring device like that disclosed in Patent No. 1,053,068, granted February 11, 1913, may be used for this purpose.

The supply of sensitized paper or material is preferably contained in the casing 67 in the form of a roll 69 which may be wound upon a spool 70, and the spool may be mounted within the casing 67 by a shaft 71. The portion of the strip which unwinds from the roll preferably passes over a pair of idler rollers 72 and thence through a slot 73 formed in a partition 74 which divides off the spool compartment of the casing 67 from the portion of this casing which contains the feed rolls; and the portion of the strip which lies between the idler rollers 72 may pass beneath a third idler roller 75 which bends this portion of the strip downwardly, thus imposing a sufficient tension on the strip to insure proper feeding thereof and also providing a light guard which will prevent the entrance of light to the spool compartment of the casing 67 through the slot 73. The compartment of the casing 67 which contains the feed rolls 63 is preferably provided with a door 76 which is capable of being opened or removed for the purpose of threading the paper strip between the feed rolls 63, and the idler rolls 72 and 75 which cooperate with the paper strip prevent the entrance of light, admitted to one side of the partition 74 by the opening or removal of the door 76, to the compartment of the casing 67 which contains the paper roll. To facilitate threading of the paper strip past the idler rollers 72 and 75 and through the slot 73 in the partition 74, the idler roller 75 is preferably mounted on a door or panel 77 which is removable or capable of being opened relatively to the casing 67, so that when the door 77 is in open position the paper strip may be laid over the idler rollers 72 and its end passed through the slot 73. In carrying out this arrangement, the idler rollers 72 are mounted on a ledge 74ª which forms a part of the partition 74.

Means is provided within the camera casing 13 for bending or reflecting the light rays from the object on the copy-board 2, and which rays pass through the camera lens 11, on to the sensitized surfaces on the opposite sides of the portion of the sensitized strip which is positioned between the image glasses 54. As shown in the present instance, a pair of mirrors 78 are provided for this purpose, these mirrors being capable of occupying such angular positions relatively to the plane of the paper strip lying between the image glasses 54 that they will focus the images of the object upon the respective sensitized surfaces of the paper strip. These mirrors, moreover, are so positioned relatively to the focussing or ground glasses 47 that when the optical system of the camera is properly adjusted to correctly focus the images on the ground glasses 47, the mirrors, when in operative position will correctly focus the images on the respective sensitized surfaces of the paper strip. It will be observed from Figure 9 that in the present instance, the focussing screen or ground glasses 47 are positioned perpendicularly to the axis of the optical system of the camera, the plane in which the sensitized strip or medium is positioned between the image glasses 54 is perpendicular to the plane of the focussing glasses and in alinement with the optical axis of the camera, and the mirrors 78 when in the operative position as shown by the full lines in this figure bisect the angles formed between the opposite sides of the sensitized medium or strip so positioned and the respective focussing screen 47, the planes of the mirror surfaces intersecting in the plane of the front or ground surface of the focussing screen and at the point where such plane is intersected by the projected plane of the sensitized strip.

The present invention provides means whereby the mirrors may be moved out of the operative position just described to permit the images of the objects to be photographed to be projected on the focussing screen or ground glasses 47 after which the mirrors can be moved into the operative positions above described to project the images, properly focussed, on to the respective sensitized surfaces of the paper or photographic medium positioned between the image glasses 54. Preferably and as shown in the present instance, the mirrors are attached by clips 79 to a pair of similar carriers 80, and means is provided for guiding either one or both of these carriers in their movements out of operative position to permit focussing, and into operative position to effect exposure of the sensitized medium. Preferably, both mirrors are shiftable in the manner described, and in the particular construction shown the upper side of the lower plate 46 and the lower side of the upper plate 46ª have secured thereto pairs of parallel guides or tracks 81 in which rollers or projection 82 on the carriers 80 are adapted to travel, these rollers 82 being toward the ends of the carriers 80 which are adjacent to the focussing or ground glasses 46. The upper side of the lower plate 46 and the lower side of the upper plate 46ª also have secured thereto guides or tracks 83 which extend in directions approximately at right angles to the tracks 81, and the tracks 83 are adapted to receive and cooperate with rollers or projections 84 which are attached to the upper and lower edges of the carriers 80 toward the ends thereof which are remote from the focussing or ground glasses 47.

Figure 5:
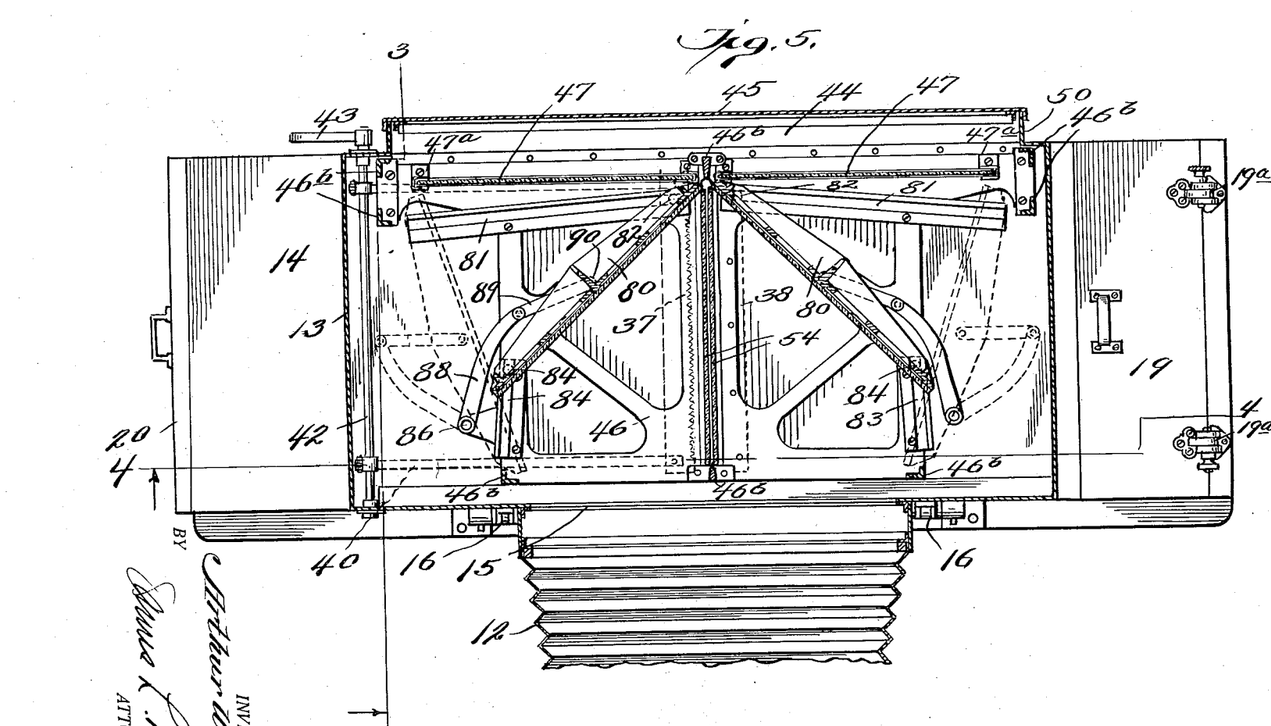
Figure 5 represents, on an enlarged scale, a horizontal section through the camera head, on the line 5—5 of Figure 1.
Figure 6:
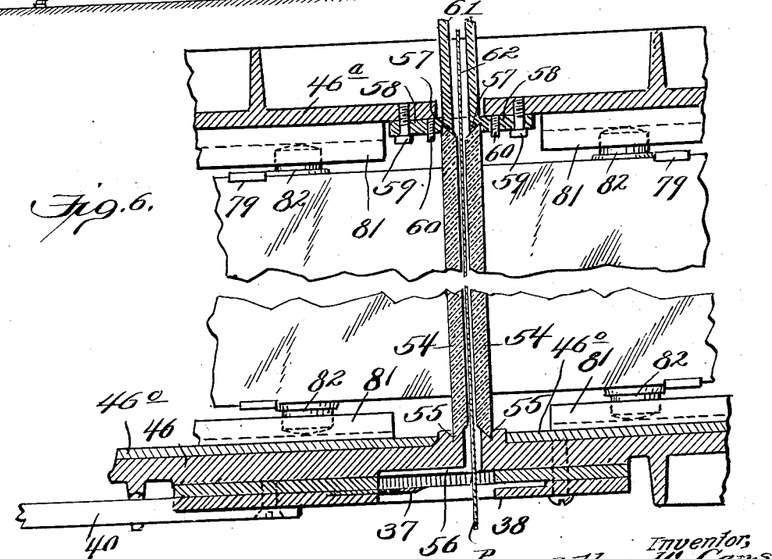
Figure 6 is a detail view, on an enlarged scale, illustrating in vertical section the image glasses between which the sensitized medium is positioned, and illustrating the cooperating rectifying mirrors which reflect the lens images on to opposite sides of the sensitized medium positioned between the image glasses.
Figure 7:
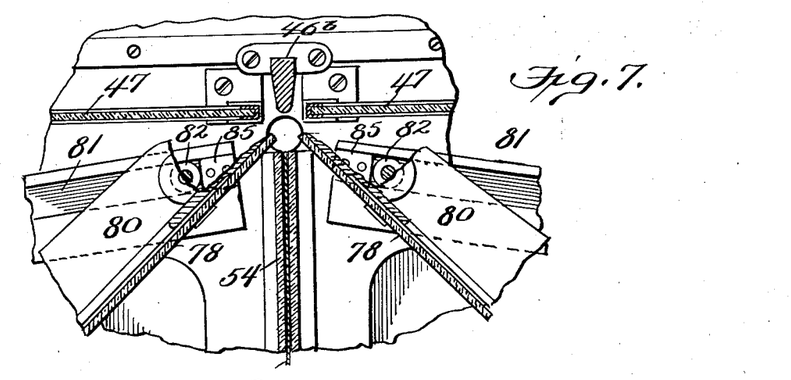
Figure 7 is a detail view, on an enlarged scale, illustrating the relative arrangement of the image glasses, the cooperative rectifying mirrors and the focussing or ground glasses.
Figure 8:
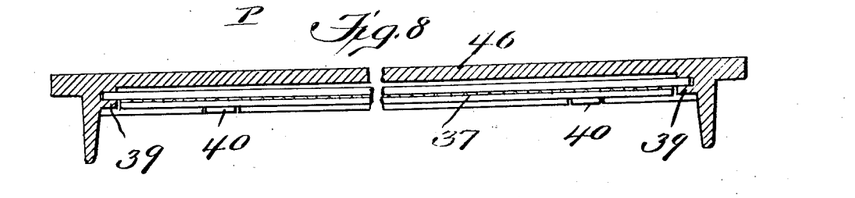
Figure 8 is a detail view representing in transverse section the mounting for the knife which severs the exposed portions of the sensitized strip, as such portion is fed into the developing tank.

By this track arrangement it will be understood that the mirror supports 80 are guided to swing either from the operative full line position shown in Figure 5 into the inoperative dotted line position shown in that figure, or vice versa, the ends of the mirrors adjacent to the focussing or ground glasses 47 being guided by the pins 82 and cooperating tracks 81 to travel apart and toward the outer or remote ends of the focussing glasses 47, while the opposite or forward ends of the mirrors are guided by the pins 84 and the cooperating tracks 83 to move forwardly, as the mirrors are swung from the operative to the inoperative position, and vice versa. Stops 85 at the inner ends of the tracks 81 serve as abutments for the rollers or projections 82 whereby the mirrors will be arrested in their motion as they approach the operative position, as shown in Figure 7, these stops thereby serving to accurately position the mirrors in operative position. When the mirrors are swung to the inoperative dotted line position shown in Figure 5 they enable the light rays of the objects passing through the camera lens to proceed unobstructedly to the focussing or ground glasses 47, and hence accurate focussing of the camera can be attained by observing the sharpness of the images projected on to the focussing or ground glasses 47 while the optical elements of the camera are being adjusted for focussing purposes.

Means is preferably provided for synchronizing the movements of the upper and lower portions of the mirrors while they are being shifted from operative to inoperative position, and vice versa, thereby compensating for any looseness or play that might exist between the tracks 81 and 83 and the cooperating rollers or pins 82 and 84. The synchronizing means shown in the present instance comprises a shaft 86 for each mirror, each of these shafts being mounted at its upper and lower ends in relatively fixed bearing brackets 87 which may be attached to the outer edges of the lower and upper plates 46 and 46ª, each shaft having a pair of arms 88 which are fixed thereon and project at the same angle therefrom. The outer ends of the arms 88, which operate in planes approximately on the same levels with the upper and lower edges of the mirror carriers 80 are operatively connected to the upper and lower portions of the respective mirror carriers by links 89 which are pivotally connected to the arms 88 and are also pivotally connected at 90 to the upper and lower portions of the respective mirror carrier. Each shaft 86, therefore, provides an operative connection between the upper and lower portions of the respective mirror carrier and insures simultaneous movement of the upper and lower portions of the respective mirror carrier through the same angle, and hence tipping or binding of the mirror carrier in its guides, due to play or lost motion between the guides and the cooperating rollers or pins on the mirror carrier is prevented. As shown in the present instance, each mirror carrier is provided individually with synchronizing means for its upper and lower ends, and each mirror can be shifted into operative or inoperative position independently of the other mirror carrier, as well as conjointly therewith.

Figure 9:
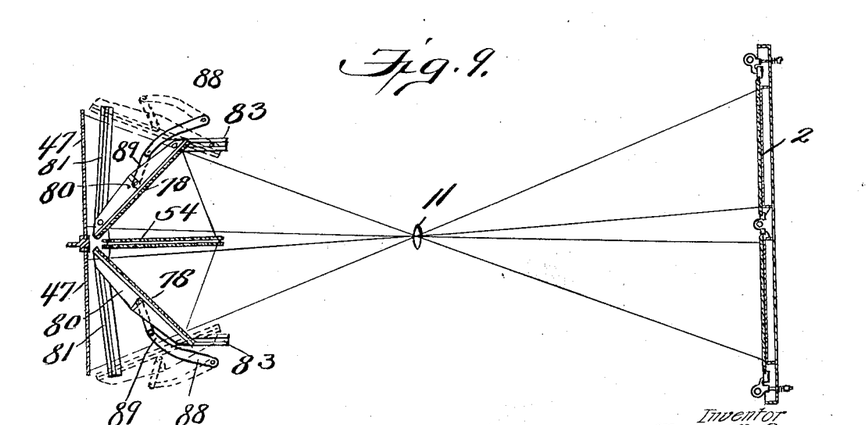
Figure 9 is a view showing diagrammatically the manner in which the apparatus may be focussed while the images of the objects are under actual observation, the diagram showing the rays of light passing from the object through the camera lens direct to the focussing or ground glasses when the mirrors are swung into the dotted line positions shown in this figure, the diagram also showing the bending of the light rays of the mirrors and the projecting of the rays on the opposite sides of the sensitized paper positioned between the image glasses, when the mirrors occupy the full line positions shown in this figure.
Figures 10, 11, 12, 13:
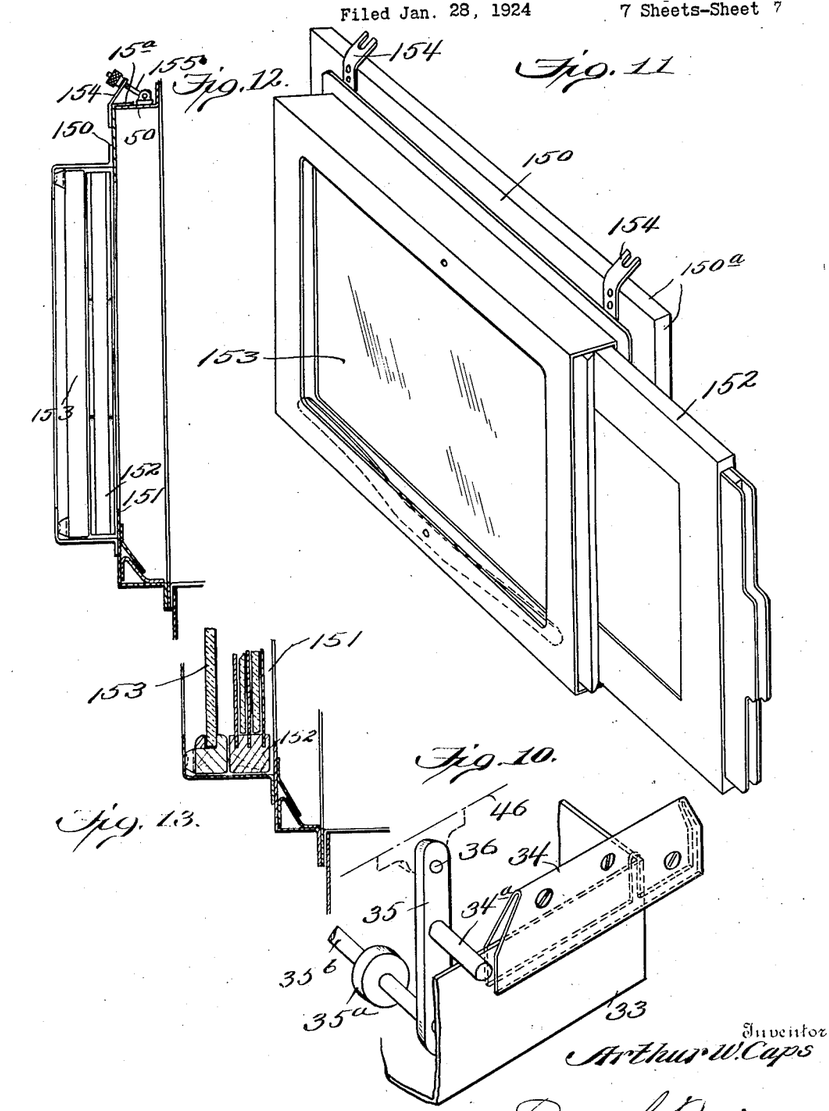
Figure 10 is a fragmentary view, showing one end of the fixing tray and the cams thereon for deflecting the print immerser.
Figure 11 is a detail perspective view of the plate-holder adapter for adapting the apparatus for the exposure of photographic plates.
Figure 12 represents a transverse section through the plate-holder adapter and the adjacent portion of the casing of the apparatus, illustrating the manner in which the plate-holder adapter may be substituted for the focussing screen or ground glass.
Figure 13 is a detail sectional view showing the manner of removably mounting the lower edge of the plate-holder adapter.

The mirror guides 81 preferably diverge from the plane of the focussing or ground glasses 47 as they approach the outer ends of the ground glasses, as is shown in Figures 7 and 9, in order to insure proper clearance between the rear ends of the mirrors and their carriers and the ground glasses.

The plates 146 applied to the lower member 46 of the framework which supports the image glasses, mirrors and focussing or ground glasses completely close the bottom of the camera casing 13, the latter being thereby partitioned off to protect the camera elements contained therein from the chemicals contained in the lower casing 14, and in particular the slivered surfaces of the mirrors, when such are used, will be thereby protected from the oxidizing or other injurious influences of the chemicals in the casing 14.

The bottom of the casing 14 which slopes in all directions toward the outlet 21 serves to drain from the casing 14 any chemicals which may splash or spill from the developing or fixing tank, thus avoiding the accumulation of such chemicals within the casing 14 which, if it occurred, would cause deterioration, and, moreover, when the use of the apparatus is to be discontinued for any considerable length of time, the doors 19 and 20 may be opened, whereby circulation of air is provided for through these door openings and the opening 21 which will serve to dry out the interior of the casing 14.

The present invention provides photographic apparatus embodying means for positioning oppositely or reversely-arranged sensitized surfaces for exposure through the medium of mirrors or equivalent reflecting means, together with means whereby such mirrors or reflecting means may be easily and quickly swung into a position which will enable images of the objects to be photographed to be projected onto a focussing screen and then restored to their operative positions where they will project the images, properly focussed, onto the sensitized surfaces. The invention therefore enables the optical elements of the apparatus to be adjusted for focussing purposes while the image of the object to be photographed is under the actual observation of the operator, thus enabling the apparatus to be focussed more accurately than has heretofore been possible where focussing scales have been used for focussing purposes.

I claim as my invention:—

1. In photographic apparatus, the combination of a lens, ray-bending means for directing rays from said lens toward one another to a common focal plane, means for holding a sensitized medium in the focal plane thus established, and a focussing screen located in another focal plane of said lens, said ray-bending means being movable into positions which permit passage of rays from the lens to the focussing screen.

2. In photographic apparatus, the combination of a lens, a focussing screen operatively related thereto, a support for holding a sensitized medium in a plane perpendicular to that of the focussing screen, and ray-bending means adapted to occupy planes which respectively bisect the angles between the opposite sides of said support and the focussing screen to direct the rays from the lens onto the opposite sides of the sensitized medium and movable out of said planes to cause the rays from the lens to be received by the focussing screen.

3. In photographic apparatus, the combination of a lens, a focussing screen located in the focal plane thereof, a sensitized medium support arranged in a plane transverse to that of the focussing screen, and reflectors mounted to occupy planes which bisect respectively the angles between the opposite sides of said support and the screen, thus intercepting the rays from the lens and projecting them onto the sensitized medium, said reflectors being movable into positions which permit unobstructed passage of the rays from the lens to the focussing screen.

4. In photographic apparatus, the combination of a lens, a support for a sensitized medium, a pair of reflectors mounted to swing into angular positions at the opposite sides of said support to direct rays from the lens onto a sensitized medium, and a focussing screen arranged to receive rays from the lens when said reflectors are swung out of said positions.

5. In photographic apparatus, the combination of a lens, a focussing screen operatively related thereto, a support for a sensitized medium arranged in a plane perpendicular to the plane of said screen, and a pair of reflectors mounted to swing into angular positions at opposite sides of said support to direct rays from the lens onto a sensitized medium and withdrawable from such positions to permit passage of rays from the lens to the focussing screen.

6. In photographic apparatus, the combination of a lens, a focussing screen in the focal plane thereof, a support for positioning a sensitized medium in a plane perpendicular to the plane of the focussing screen, and reflecting means mounted to occupy a plane which bisects the angle between the focussing screen and the adjacent side of said support and operative to direct rays from said lens onto the sensitized medium, the edge of the reflecting means toward the apex of said angle being guided to move in substantially the direction of the plane of the focussing screen and the other edge thereof being guided to move in a direction substantially perpendicular to the plane of the focussing screen, whereby said reflecting means may be swung in a direction to uncover the focussing screen to rays from the lens.

7. In photographic apparatus, the combination of a lens, a focussing screen positioned to receive focussed rays from said lens, a support for positioning a sensitized medium in a plane perpendicular to that of the focussing screen, and mirrors mounted to swing into planes which bisect respectively the angles between the opposite sides of the sensitized medium and the focussing screen and operative to bend rays from the lens onto both sides of the sensitized medium.

8. In photographic apparatus, the combination of a lens, a focussing screen positioned to receive rays from the lens, a support for a sensitized medium positioned in a plane perpendicular to that of the focussing screen, a pair of reflectors adapted to occupy positions in planes which bisect respectively the angles between the opposite sides of said support and the focussing screen, and means for guiding the reflectors for movement to and from said positions comprising a pair of tracks for each reflector, one track extending approximately perpendicular to the other track, and projections travelling in said tracks and connected to the respective reflector toward opposite edges thereof.

9. In photographic apparatus, the combination of a lens, a focussing screen operatively related thereto, a support for a sensitized medium positioned in a plane perpendicular to that of the focussing screen, a pair of reflectors adapted to occupy positions in planes which intersect the angles between the opposite sides of said support and the focussing screen and to direct rays from the lens onto opposite sides of a sensitized medium, and means for guiding the reflectors to move into said positions and also into positions to uncover the focussing screen to rays from the lens comprising a track cooperating with the edge of the respective reflector which is adjacent to the focussing screen, said track diverging from the focussing screen as it proceeds from said support, and a second track cooperating with the opposite edge of the respective reflector and extending in a direction transverse to the track first-mentioned.

10. In photographic apparatus, the combination of a lens, a support for a sensitized medium, a mirror having means for guiding it to swing about a shifting axis into an angular position relatively to said support to direct rays from the lens onto the sensitized medium, and means cooperative with said guiding means for synchronizing the movements of opposite edges of the mirror.

11. In photographic apparatus, the combination of a lens, a support for the sensitized medium, a mirror having means for guiding it to swing about a shifting axis to and from an angular position relatively to said support, a rotatable shaft, and means operatively connecting opposite ends of the mirror to said shaft to synchronize the movements of said ends.

12. In photographic apparatus, the combination of a lens, a support for positioning photographic material for exposure, a mirror having means for guiding its front and rear edges in relatively angular paths to swing the mirror to and from a position to direct rays from the lens onto the photographic material, and means for synchronizing the movements of the upper and lower portions of the mirror comprising a rotatable shaft having arms projecting at the same angle therefrom, and links operatively connecting said arms to the upper and lower portions of the mirror.

13. In photographic apparatus, the combination of a support for positioning photographic material for exposure, a mirror for directing light rays onto such material positioned by said support, and means for mounting the mirror to swing to and from operative relation with said support comprising tracks extending approximately perpendicularly to one another and cooperative with two opposite edge portions of the mirror, and means cooperative with the other opposite edges of the mirror to synchronize the movements thereof.

14. In a photographic apparatus the combination with an upper casing forming an exposing chamber and containing reflecting surfaces, of a lower chamber adapted to contain liquid holding developing devices into which the prints pass from the exposing chamber, said developing chamber being provided with a vent at its bottom and with openings at its ends exteriorly of the upper casing to set up a circulation of air in the developing chamber and dry it before vapors materially affect the reflecting surfaces.

15. In photographic apparatus, the combination of a pair of opposed relatively fixed plates having alined slots therein and pairs of seats at opposite sides of said slots, and a pair of glass plates having their edges engaged in the respective seats and providing a passageway between them for a sheet of photographic material.

16. In photographic apparatus, the combination of a pair of glass plates adapted to receive and position a strip of photographic material between them, opposed relatively fixed supporting members, one of which is formed with a pair of seats to receive respectively an edge of each glass plate, parts adjustably mounted on the other member and having respectively seats to receive opposite edges of the glass plates, and means for adjusting said parts relatively to their supporting member in a direction toward the opposed seats on the other member to clamp and secure the glass plates in position between the opposed supporting members.

17. In photographic apparatus, the combination of a pair of opposed plates which provide a passageway between them to receive and position a sheet of photographic material for exposure, and feed rolls located in advance of the sheet-receiving end of said passageway and operative to advance a sheet of such material to and through said passageway and threaded devices for positively adjusting the guides edgewise in both directions toward and from the plates.

18. In photographic apparatus, the combination of a pair of opposed glass plates spaced apart to provide a passageway to receive and position a sheet of photographic material for exposure, feed rolls located in advance of the sheet-receiving end of said passageway and operative to advance a sheet of such material to said passageway, guides forming edgewise continuations of said glass plates, said guides extending between the glass plates and the feed rolls and being spaced apart to receive and direct a sheet of material advanced by the feed rolls to said glass plates and adjusting means for clamping the said guides edgewise against the plates.

19. In photographic apparatus, means for supplying a strip of photographic material comprising a casing having a partition therein which divides it into a supply compartment and a feeding compartment, the partition having an opening through which the strip passes from the supply compartment to the feeding compartment, a door which provides access to the feeding compartment, and a light-excluding closure for the opening in said partition comprising a plurality of ilder rollers arranged in staggered relation between said opening and the supply compartment and between which rollers the strip is adapted to be threaded.

20. In photographic apparatus, the combination of an exposing lens, means for holding a sheet of sensitized photographic material for exposure on both sides, means for holding a sheet of sensitized photographic material for exposure on one side thereof, and ray-bending means operative when in one position to direct the exposing light rays from the lens on to the opposite sides of the first-mentioned sensitized sheet and movable into a position out of the path of the exposing rays and thus permit such rays to pass to the second-mentioned sensitized sheet.

21. In a photographic apparatus, the combinations with a casing, a lens and a centrally arranged means for holding a sheet of photographic material sensitized on both sides in a position for exposure wherein it lies in the plane of the axis of the lens, a second holder for photographic material arranged rearwardly of and at right angles to the first, mirrors having operative positions on opposite sides of the first mentioned holder to direct rays from the lens on opposite sides of the sheet, and means for moving one of said mirrors to a substantially parallel position opposite the first mentioned holder to permit rays from the lens to strike directly upon the material in the second mentioned holder.

22. In a photographic apparatus, the combination with a casing, a lens and a centrally arranged means for holding a sheet of photographic material sensitized on both sides in a position for exposure wherein it lies in the plane of the axis of the lens, mirrors having operative position on opposite sides of the holder to direct rays from the lens onto opposite sides of the sheet, and means for moving one of said mirrors to an inoperative position.

In testimony whereof I have hereunto set my hand.

ARTHUR W. CAPS.